United States Patent [19]

Yee

[11] 4,247,596

[45] Jan. 27, 1981

[54] ELECTRICAL FIBER CONDUCTOR

[76] Inventor: Tin B. Yee, 719 Erskine St., NW., Huntsville, Ala. 35805

[21] Appl. No.: 38,027

[22] Filed: May 10, 1979

[51] Int. Cl.[3] .......................... B32B 15/00; B05D 5/12; D02G 3/00

[52] U.S. Cl. .......................... 428/380; 427/125; 427/123; 427/121; 428/381; 428/389; 428/392; 428/393; 428/394; 428/395; 427/343

[58] Field of Search .............. 428/375, 379, 389, 381, 428/380, 901, 392, 394, 395; 427/123, 125, 126, 58, 96, 117, 118

[56] References Cited

U.S. PATENT DOCUMENTS

| | | | |
|---|---|---|---|
| 2,900,274 | 8/1959 | Whitehurst | 428/388 |
| 2,986,480 | 5/1961 | Reiss | 427/125 |
| 3,179,575 | 4/1965 | Dippel et al. | 427/125 X |
| 3,792,520 | 2/1974 | Weiner | 427/125 X |
| 3,940,533 | 2/1976 | Arsac | 427/125 X |
| 4,042,737 | 8/1977 | Forsgren et al. | 427/125 |
| 4,049,844 | 9/1977 | Bolon et al. | 427/125 |

FOREIGN PATENT DOCUMENTS

| | | | |
|---|---|---|---|
| 246,378 | 1/1961 | Australia | 427/125 |
| 49-27568 | 12/1974 | Japan | 427/125 |

OTHER PUBLICATIONS

Hibberd; R. G., "Integrated Circuits", McGraw—Hill Book Company, pp.42–46.

*Primary Examiner*—Lorraine T. Kendell
*Attorney, Agent, or Firm*—Nathan Edelberg; Robert P. Gibson; Jack W. Voigt

[57] ABSTRACT

Electrical conductors for use in microelectronic circuitry are prepared from a flexible, polymeric fiber selected from the group of flexible, polymeric fibers consisting of silk, polyacrylonitrile, regenerated cellulose, polyester, and polyamide. The selected fiber is made conductive by coating by a method wherein the fiber is immersed for a predetermined time period of from about 30 minutes to about 60 minutes in a solution prepared from equal portions of a silver nitrate-aqueous ammonia solution and a silver nitrate-potassium-sodium tartrate solution. These solutions coat the selected polymeric fiber with metallic silver. The excess solution is washed off and the coated fiber is air dried or dried in a low temperature oven at about 50° C. The process is repeated if a heavier coating of silver on the fibers is desired for better conductivity. For use, the metallic silver coated fiber is cut to required length and tested for resistivity which should be near one ohm. The conductive fiber is positioned in place and secured wih a small amount of electrical conductive epoxy adhesive which is subsequently cured. In cases where a conductor will cross over another conductor it is necessary to insulate these conductors. The insulating can be effected by placing some non-conductive epoxy adhesive between points of contact.

7 Claims, No Drawings

ELECTRICAL FIBER CONDUCTOR

DEDICATORY CLAUSE

The invention described herein may be manufactored, used, and licensed by or for the Government for governmental purposes without the payment to me of any royalties thereon.

BACKGROUND OF THE INVENTION

The employment of microelectronic circuitry has made possible many advanced developments in missiles and rocketry. Although many improvements have been made, many more improvements are made necessary by the added environmental forces to which a missile or rocket will be subjected. Of particular importance are the techniques used to make secure connections in microelectronic circuitry. The connections must be secured and remain secured and reliable after being secured. The present invention is particularly adapted to making secure connections in microelectronic circuitry, such as from the metallized pads on an integrated circuit (IC), to the metallized pads on the substrate in a hybrid IC. It is important that the described connections be well secured and reliable in any microcircuitry, particularly in hybrid integrated circuits used in the guidance and control of rockets and missiles in flight.

The environmental forces that a missile or rocket is subjected to when it leaves the launcher and those subjected to during in-flight maneuvers means that all the connections in the hybrid integrated circuits in the guidance and control package of the missile or rocket must remain intact. Thus, the system must withstand the hundreds or thousands of gravity forces created as a result of taking off or as a result of fast maneuvers after take off.

The present day art of making the majority of microelectronic circuitry electrical connections from the metallized pads on the IC to the metallized pads on the substrate is effected by wire bonding. In general, aluminum or gold wire of about a mil in diameter is used. The technique of making the wire to adhere or secure to the metallized pads and other conductors on the substrate is by thermocompression bonding or by ultrasonic bonding.

In the thermocompression bonding, the wire is first placed on an area of heated substrate chip. The heat of substrate will help soften the metallized pad to which a connection is to be made. When pressure is put on the wire, from a hard metal tool, the pressure will cause the wire to deform and spread which will assist making contact with the metallized surface of the area. The pressure and the heat causes the two closely contacted metal systems to weld or adhere together. The temperature used during bonding is near the eutectic temperature of the two metals, so a eutectic bond can form. The heating, the pressure, and the mechanical action by the thermocompression of the chip, can cause damage to the microcircuit on the chip. The heat applied during the thermocompression bonding has a time limit and sometime the eutectic bond may not be formed by the two metals.

In ultrasonic bonding, a bonder makes rapid rubbing on the wire against the bonding pad. The rubbing (ultrasonically) causes very high localized temperatures. The heat, hot enough to cause melting and the formation of intermetallics, will cause bonding to be formed. Tool pressure in ultrasonic bonding influences the resonance of the system. The ultrasonic transducer that is used in driving the tool must resonate to produce the bonding energy is difficult to set for maintaining proper resonant frequency. The vibration of the bonder may cause damage to the microcircuit on the chip.

Wire bonding at its best is not as reliable as desired. The wire bonding step is the weakest step in the entire process of IC making. This conclusion has been made because the majority of the field failures of integrated circuits are due to the wire bonding faults.

Advantageous would be a method for producing a flexible, electrical conductor for making connections in microelectronic application, particularly, where the microelectronic circuitry is to be used in a missile or rocket which will be subjected to high gravity environments. An electrical conductor that is flexible and adaptable for making connections in microelectronics circuits with an epoxy adhesive should be of particular interest for high gravity environment use because of the expected lower failure rate as compared to wire bonding techniques.

An object of this invention is to provide an improved electrical conductor for connection in microelectronic application.

Another object of this invention is to provide an electrical conductor of small diameter in the mil range that is adaptable for microcircuitry use.

A further object of this invention is to provide a connecting conductor that can be securely connected in a hybrid integrated circuit with electrical conductive epoxy adhesive.

Still a further object of this invention is to provide a flexible electrical conductor that is more conducive for use in a high gravity environment where rigid connections employing wire bonding techniques have resulted in failures due to wire bonding faults.

SUMMARY OF THE INVENTION

The electrical conductor of this invention is flexible and adaptable for use in microelectronics circuits where connections can be made with a conductive epoxy adhesive. The conductor is prepared from a flexible, polymeric fiber-selected from the group of flexible, polymeric fibers consisting of silk, polyacrylonitrile, regenerated cellulose, polyester, and polyamide.

The polymeric fibers of this invention were made conductive by applying a coating by chemical means. The individual fiber which is about one mil in diameter is prepared for coating by suspending on a support means, such as a rack with a small portion of the fiber touching the rack while a major portion of the fiber is free from touching anything or individual fibers. The rack with the suspended fibers are positioned in a container for containing a chemical solution.

The coating of the fibers by fine metallic particles is accomplished by chemical means which employs chemical solutions prepared by combining an equal volume of a first solution prepared from silver nitrate solution and aqueous ammonia with an equal volume of a second solution prepared from a silver nitrate solution and potassium-sodium tartrate solution. The combined solution is poured into the container to cover the suspended fibers for a predetermined time period. The reaction forms finely divided particles of metallic silver on the fibers. The excess solution is then washed off with distilled water. The fibers can be air dried or dried in a low temperature oven at around 50° C. The process is repeated if a heavier coating is desired. The metallic silver coated fiber is cut to required length and each length is tested for resistivity which should be near one ohm. To make electrical connection, for example, from the metallized pad on the chip to the metallized pad on the substrate, a small amount of an electrically conductive epoxy adhesive is employed and cured for the required time. Should it be required for one conductor to cross over and touch another then an insulation material must be placed between the conductors. A small amount of a nonconductive epoxy resin is a suitable insulation material for the described use.

DESCRIPTION OF THE PREFERRED EMBODIMENT

The electrical conductor of this invention is especially suitable for making connections in microelectronic curcuits. The conductor is a flexible, polymeric fiber selected from the group of fibers consisting of silk, polyacrylonitrile, regenerated cellulose, polyester, and polyamide. This fiber is made conductive by coating with fine metallic particles of silver.

An example of the regenerated cellulose fiber used in this invention is the "Megalon" polyfilament kite cord, manufactured by Trio Manufacturing Co., Forsyth, Ga. 31029. The fibers from this cord are about a mil in diameter. Also an example of the polymeric fibers used in this invention is the Orlon acrylic fiber. Another example of polmeric fibers used in this invention is the nylon fiber. These polymeric fibers are about a mil in diameter.

The individual fiber is prepared for coating by suspending between racks with a small portion of the fiber touching the rack while a major portion of the fiber is free from touching anything or individual fibers. The rack with the suspended fibers are positioned in a container for containing a chemical solution. The chemical solution is added to the container to completely cover the fibers for a contact period of from about one half hour to one hour which results in a coating of metallic particles being deposited on the fiber. The chemical solutions employed for coating the fibers are described below under Examples and Procedures.

EXAMPLE AND PROCEDURE FOR PREPARATION OF SILVER NITRATE SOLUTION NO. 1.

Dissolve 5 grams of silver nitrate in 300 ml of distilled water and add dilute aqueous ammonia until the precipitate formed is nearly, but not entirely redissolved. The solution will change to a brown color when the first portion of aqueous ammonia is added. As more aqueous ammonia is added, the color of the solution will change to a dark brown and finally, the dark brown color will disappear. Filter the solution and add water to make 500 ml.

EXAMPLE AND PROCEDURE FOR PREPARATION OF SILVER NITRATE SOLUTION NO. 2.

Dissolve one gram of silver nitrate in a small quantity of water and pour into about half liter of boiling water; dissolve 0.83 gram of Rochelle salts (potassium-sodium tartrate) in a small quantity of water, and add to the boiling solution. Continue the boiling for half an hour, till a gray precititate collects as a powder on the bottom of the flask. Filter hot, and add water to make 500 ml. The two solutions may be kept in the dark for a month or two.

For "coating" the fibers with metallic silver, equal volume of solution No. 1 and solution No. 2 are mixed to yield a mirror forming solution which is poured into the container where the rack and fibers are suspended. The rack and the fibers must be covered with the mixed solution. A reaction will take place when the above solutions are mixed together. The silver salt is reduced to metallic silver and the precipitates of the metallic silver are deposited on the wall of the container as well as on the fibers themselves. The container with the solution in it should be shaken gently a few times a minute. The fibers should stay in the solution from half of an hour to an hour. Then the fibers and the rack are withdrawn from the container and placed in a beaker of distilled water to wash off the excess solutions. The fibers can be dried in air or in a low temperature oven of around 50° C. In order to have a heavier coat of silver on the fibers for better conductivity, the depositing process must be repeated for two or more times. Each time, new solutions must be used.

For use, the metallic silver "coated" fiber is cut to required length (e.g., about one centimeter) and each piece must be tested with an ohm meter. The resistivity of the piece used should be near one ohm per about one centimeter of length.

An additional improvement in conductivity of fibers is achieved by washing the dried metallic coated fiber with a dilute hydrochloric acid solution (e.g., about 10–20%) for about one minute. This washing removes impurities from the surface of the dried metallic coated fiber. The fiber is then again rinsed with distilled water and dried as before.

To make connection, for example, from the metallized pad on the chip to the metallized pad on the substrate, a small amount of electrical conductive epoxy adhesive, such as the Ablebond-32 silver filled, made by Ablestik Laboratory, Gardena, Calif. 90248, is placed on the pads with a fine tool. The ends of the metallic "coated" fiber conductor are carefully placed on the drops of the epoxy adhesive on the pads. At room temperature the epoxy adhesive has a consistency to allow the end of the fiber conductor end. Another way to do this is as follows: First, position the fiber conductor on the substrate with its two ends touching the metallized pads to be connected, and temporarily secure the fiber with a piece of adhesive tape. Then a drop of conductive epoxy adhesive is placed on the fiber conductor end. A light touch on the drop with a fine tool will spread the conductive epoxy adhesive to the pad to make the connection. The conductive epoxy adhesive must be cured, for example, for at least an hour at 125° C. The conductive epoxy adhesive has a shelf life of about a week at room temperature of 25° C.

Some times one conductor will cross over another conductor which is not insulated. In this case, insulaton material must be placed between the two conductors. Some nonconductive epoxy adhesive can be used for this purpose.

I claim:

1. A process for preparing an electrical conductor of about 1 mil diameter for use in microelectronic circuitry, said process which employs a mirror forming solution from which a coating of metallic silver is deposited on a flexible fiber to render said flexible fiber conductive with a measured resistivity of about one ohm per centimeter of length comprising:

(i) providing a flexible, polymeric fiber selected from the group of flexible, polymeric fibers consisting of silk, polyacrylonitrile, regenerated cellulose, polyester, and polyamide which has a diameter of about 1 mil and which functions as a support for a silver coating that renders said flexible, polymeric fiber conductive;

(ii) preparing a mirror forming solution from which a coating of metallic silver is deposited on said flexible, polymeric fiber, said coating being the metallic silver product deposited from the mirror forming solution prepared by combining an equal volume of a first silver nitrate solution with an equal volume of a second silver nitrate solution, said first silver nitrate solution prepared by dissolving about 5 grams of silver nitrate in a volume of about 300 milliliters of distilled water to which is added dilute aqueous ammonia to form a dark brown color which gradually disappears as additional aqueous ammonia is added, said volume of first silver nitrate solution filtered and combined with the required volume of distilled water to make a final volume of about 500 milliliters, said second silver nitrate solution prepared by dissolving about one gram of silver nitrate in a small volume of distilled water which is added to about 500 milliliters of boiling distilled water in a container, and then by dissolving about 0.83 grams of potassium-sodium tartrate in a small quantity of distilled water which is also added to said boiling water, said boiling water with the added volumes of solutions allowed to continue boiling until a gray precipitate collects as a powder on bottom of said container, then filtering said second silver nitrate solution while hot, adding distilled water to make a final volume of about 500 milliliters, and allowing said second silver nitrate solution to cool to room temperature prior to use;

(iii) coating said flexible, polymeric fiber which is first suspended between support means, placed in a container, and covered with said mirror forming solution, said coating being deposited while said flexible, polymeric fiber is allowed to remain covered with said mirror forming solution in said container for a predetermined time period from about one half hour to about one hour, said container with said mirror forming solution being shaken several times per minute while coating is being perfected to yield a metallic silver coated fiber;

(iv) removing said metallic silver coated fiber from said container and rinsing with distilled water to remove excess mirror forming solution;

(v) drying said metallic silver coated fiber in air or low temperature oven at about 50° C.;

(vi) cutting said metallic silver coated fiber in required lengths for use as electrical conductor when connected in a microelectronic circuitry; and, (vii) measuring resistivity value of said length of said metallic silver coated fiber which should be near one ohm per centimeter of length.

2. An electrical conductor prepared by the process of claim 1 wherein said flexible, polymeric fiber is regenerated cellulose and wherein said process of effecting said coating is repeated a plurality of times to yield greater conductivity of said silver coated fiber.

3. An electrical conductor prepared by the process of claim 1 wherein said flexible, polymeric fiber is silk and wherein said process of effecting said coating is repeated a plurality of times to yield greater conductivity of said silver coated fiber.

4. An electrical conductor prepared by the process of claim 1 wherein said flexible, polymeric fiber is polyacrylonitrile and wherein said process of effecting said coating is repeated a plurality of times to yield greater conductivity of said silver coated fiber.

5. An electrical conductor prepared by the process of claim 1 wherein said flexible, polymeric fiber is polyester and wherein said process of effecting said coating is repeated a plurality of times to yield greater conductivity of said silver coated fiber.

6. An electrical conductor prepared by the process of claim 1 wherein said flexible, polymeric fiber is polyamide and wherein said process of effecting said coating is repeated a plurality of times to yield greater conductivity of said silver coated fiber.

7. The process of claim 1 wherein said dried metallic coated fiber is washed for about one minute with a dilute hydrochloric acid solution to remove any impurities from the surface of said dried metallic silver coated fiber and thereafter rinsed with distilled water and dried in air or low temperature oven at about 50° C., said acid washed, distilled water rinsed, and dried electrical conductor characterized as having a greater conductivity as compared with conductivity of said electrical conductor prior to said washing, said distilled water rinsing, and said drying.

* * * * *